(12) United States Patent
Inoue et al.

(10) Patent No.: US 12,283,860 B2
(45) Date of Patent: Apr. 22, 2025

(54) MOTOR

(71) Applicant: Nidec Corporation, Kyoto (JP)

(72) Inventors: Shota Inoue, Kyoto (JP); Tomoyuki Kubota, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 413 days.

(21) Appl. No.: 17/901,024

(22) Filed: Sep. 1, 2022

(65) Prior Publication Data

US 2023/0099792 A1 Mar. 30, 2023

(30) Foreign Application Priority Data

Sep. 30, 2021 (JP) .................................. 2021-161194

(51) Int. Cl.
*H02K 3/52* (2006.01)
*H02K 21/16* (2006.01)

(52) U.S. Cl.
CPC ............. *H02K 3/522* (2013.01); *H02K 21/16* (2013.01); *H02K 2203/06* (2013.01)

(58) Field of Classification Search
CPC .... H02K 3/522; H02K 21/16; H02K 2203/09; H02K 2203/06
USPC .......................................................... 310/71
See application file for complete search history.

(56) References Cited

U.S. PATENT DOCUMENTS

| | | | | |
|---|---|---|---|---|
| 8,922,079 B2* | 12/2014 | Egami | ...................... | H02K 3/28 310/71 |
| 9,496,762 B2* | 11/2016 | Miyamoto | ............... | H02K 3/50 |
| 10,566,870 B2* | 2/2020 | Sambuichi | ............... | H02K 3/38 |
| 10,855,130 B2* | 12/2020 | Kim | ........................ | H02K 5/225 |
| 10,903,711 B2* | 1/2021 | Ogawa | ..................... | H02K 3/38 |
| 10,910,904 B2* | 2/2021 | Grasso | .................... | H02K 29/08 |
| 10,923,981 B2* | 2/2021 | Yamaguchi | ........... | H02K 5/1735 |
| 10,958,129 B2* | 3/2021 | Kizu | ....................... | H02K 9/227 |
| 11,038,397 B2* | 6/2021 | Kim | ........................ | H02K 5/225 |
| 11,056,946 B2* | 7/2021 | Takahashi | ............... | H02K 3/522 |
| 11,063,482 B2* | 7/2021 | Kazama | ............... | H02K 15/095 |
| 11,081,927 B2* | 8/2021 | Fischer | ................ | H01R 25/165 |
| 11,088,585 B2* | 8/2021 | Ikeda | ..................... | H02K 3/522 |
| 2011/0001388 A1* | 1/2011 | Fujii | ...................... | H02K 3/522 310/257 |
| 2014/0246934 A1* | 9/2014 | Egami | .................... | H02K 3/522 310/71 |
| 2014/0333165 A1* | 11/2014 | Hikita | .................... | H02K 3/522 310/71 |
| 2018/0205281 A1* | 7/2018 | Yoshida | ................... | H02K 3/50 |

(Continued)

FOREIGN PATENT DOCUMENTS

JP 2017-208919 A 11/2017
WO WO-2013118777 A1 * 8/2013 ........... H02K 1/2786

*Primary Examiner* — Alex W Mok
(74) *Attorney, Agent, or Firm* — Keating & Bennett, LLP

(57) ABSTRACT

A motor includes a rotor that includes a shaft along a central axis extending in a vertical direction, a stator that includes coils and opposes the rotor in a radial direction, a casing that supports the rotor and the stator, and a terminal attached to the casing and electrically connected to lead wires extending from the coils. The terminal includes a lead wire terminal portion that is in contact with the lead wire, an external terminal portion that is electrically connected to the lead wire terminal portion and extends toward an outside of the casing, and a holding portion that holds the lead wire terminal portion and the external terminal portion.

11 Claims, 10 Drawing Sheets

(56) References Cited

U.S. PATENT DOCUMENTS

| | | | |
|---|---|---|---|
| 2019/0296601 A1* | 9/2019 | Yamaguchi | H02K 5/225 |
| 2020/0161926 A1* | 5/2020 | Horii | H02K 3/345 |
| 2020/0220412 A1* | 7/2020 | Iwano | H02K 5/225 |
| 2021/0050760 A1* | 2/2021 | Yamaguchi | H02K 5/225 |

* cited by examiner

MOTOR

CROSS REFERENCE TO RELATED APPLICATION

The present application claims priority under 35 U.S.C. § 119 to Japanese Patent Application No. 2021-161194, filed on Sep. 30, 2021, the entire contents of which are hereby incorporated herein by reference.

1. FIELD OF THE DISCLOSURE

The present disclosure relates to a motor.

2. BACKGROUND

Conventionally, a coil of a motor is electrically connected to a control board or the like outside the motor disposed on one axial side of a motor shaft. For example, there is known a motor having a configuration including a connector to which a signal line is connected and a connector holding portion into which the connector is inserted on one axial side of a stator. A rib for press-fitting and fixing is provided inside the connector holding portion, and the connector is press-fitted and fixed by being pressure-welded to the rib.

In the related art, one end portion of the rib for press-fitting and fixing is exposed to the outside in a state where the connector is fixed to the connector holding portion. As a result, in a case where chips are generated as the connector is pressed against the rib and deformed at the time of press-fitting and fixing the connector, there is a problem that the chips scattered from one end portion side of the rib exposed to the outside.

SUMMARY

A motor according to an example embodiment of the present disclosure includes a rotor that includes a shaft along a central axis extending in a vertical direction, a stator that includes coils and opposes the rotor in a radial direction, a casing that supports the rotor and the stator, and a terminal attached to the casing and electrically connected to lead wires extending from the coils. The terminal includes a lead wire terminal portion that is in contact with the lead wires, an external terminal portion that is electrically connected to the lead wire terminal portion and extends toward an outside of the casing, and a holding portion that holds the lead wire terminal portion and the external terminal portion. The holding portion includes a rib that protrudes outward from a side surface of the holding portion and is in contact with the casing, and a cover portion that extends in a direction intersecting an extending direction at one end portion of the rib in the extending direction.

The above and other elements, features, steps, characteristics and advantages of the present disclosure will become more apparent from the following detailed description of the example embodiments with reference to the attached drawings.

DETAILED DESCRIPTION

Hereinafter, a motor according to a first example embodiment of the present disclosure will be described with reference to the accompanying drawings. Note that the scope of the present disclosure is not limited to the example embodiment described below, but includes any modification thereof within the scope of the technical idea of the present disclosure.

Figure 1:
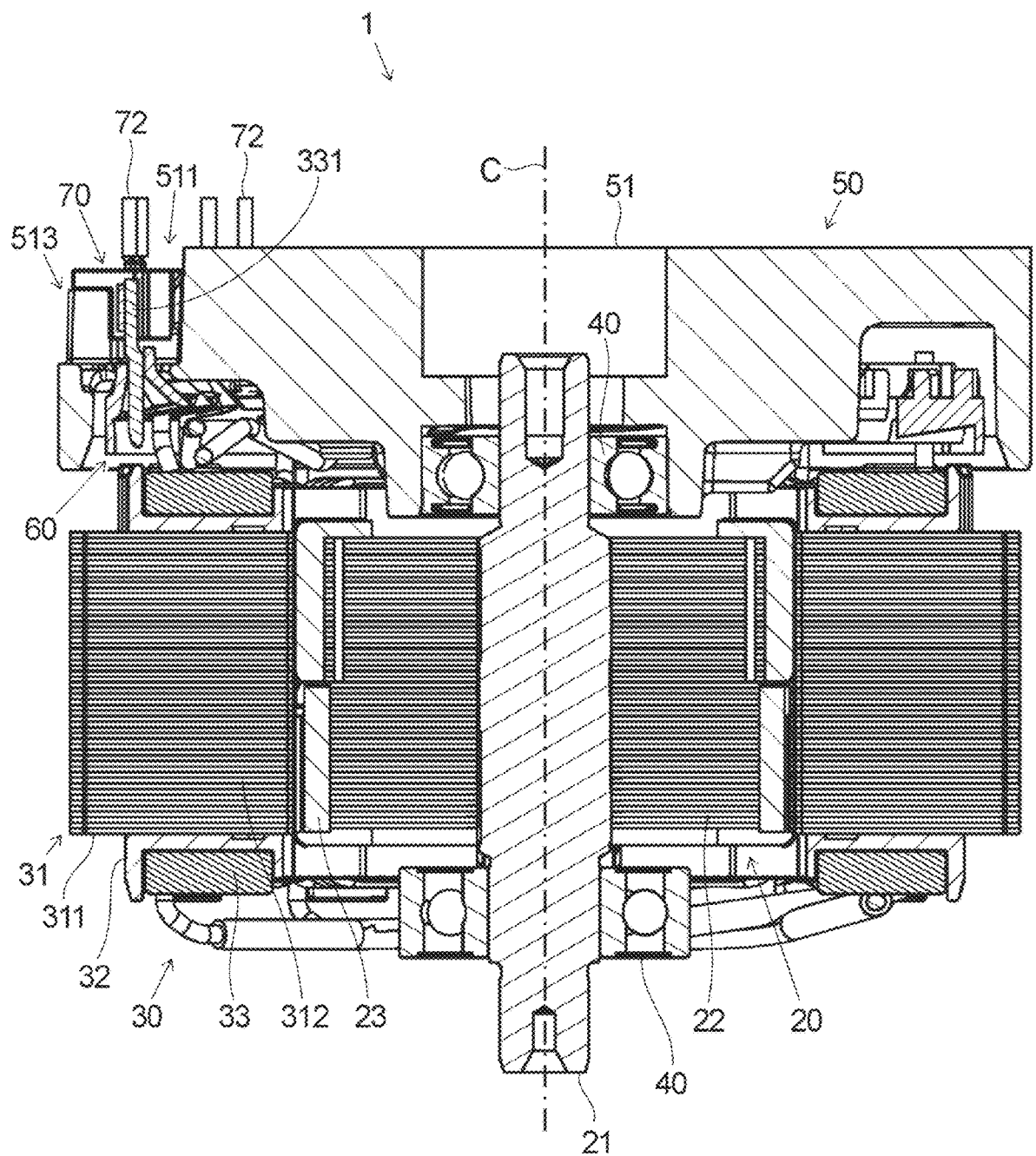
FIG. 1 is a longitudinal sectional view of a motor of an example embodiment of the present disclosure.

It is assumed herein that: a direction parallel to a central axis of the motor is referred to simply by the term "axial direction", "axial", or "axially"; a direction perpendicular to the central axis of the motor is referred to simply by the term "radial direction", "radial", or "radially"; and a direction along a circle around the central axis of the motor is referred to simply by the term "circumferential direction", "circumferential", or "circumferentially". Further, the central axis of the motor is assumed to extend in a vertical direction in the present specification for the sake of convenience in description. Therefore, a shape and a positional relationship of each portion will be described assuming that the axial direction is the "vertical direction" and the vertical direction in FIG. 1 is the vertical direction of the motor. Note that the above definition of the vertical direction does not restrict the orientations and positional relations of the motor when in use.

Further, in this specification, a section parallel to the axial direction is referred to as a "longitudinal section". Further, the terms "parallel" and "perpendicular" used in the present specification include not only those "exactly parallel" and "exactly perpendicular", respectively, but also those "substantially parallel" and "substantially perpendicular", respectively.

Figure 2:
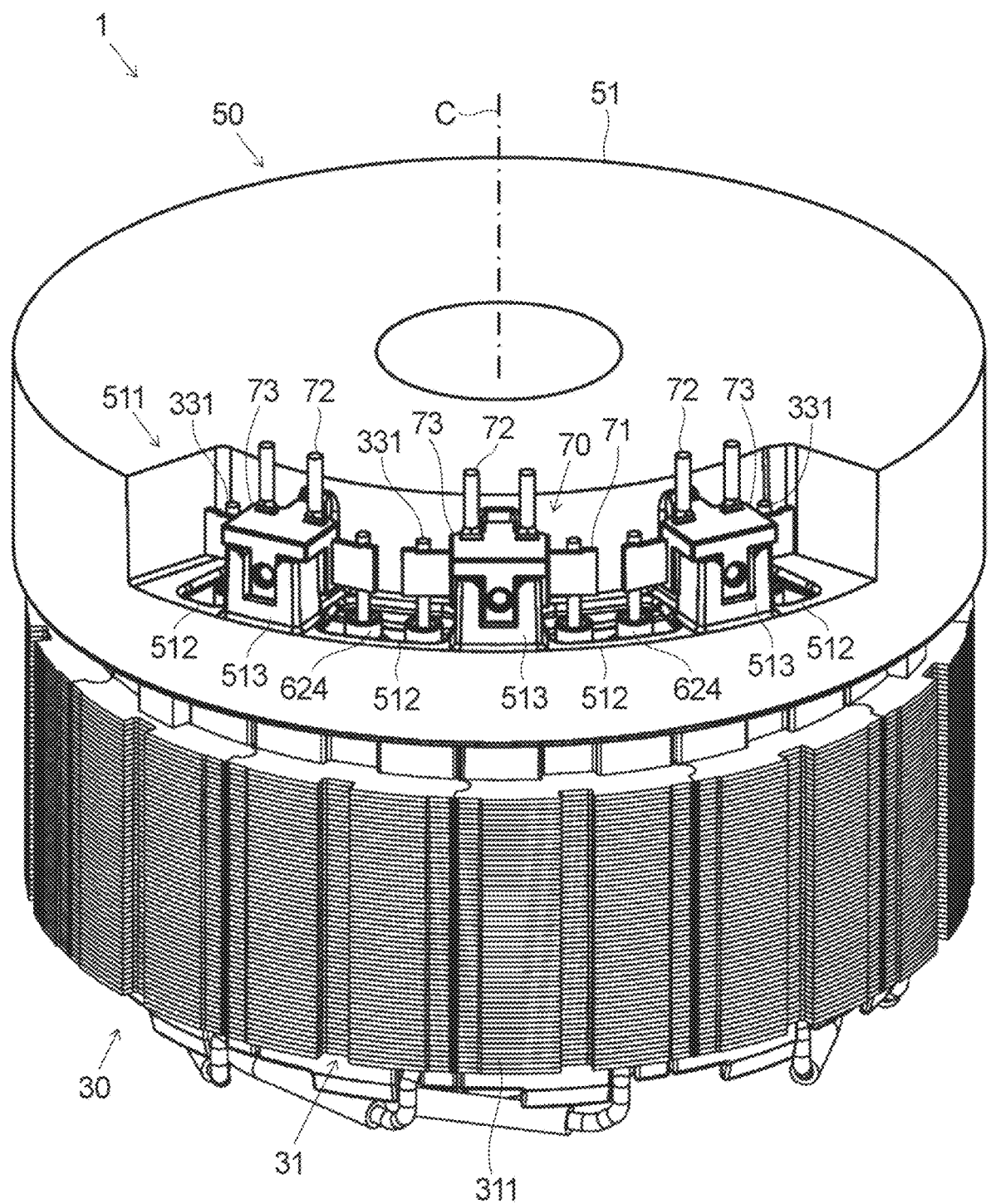
FIG. 2 is a perspective view of the motor.
Figure 3:
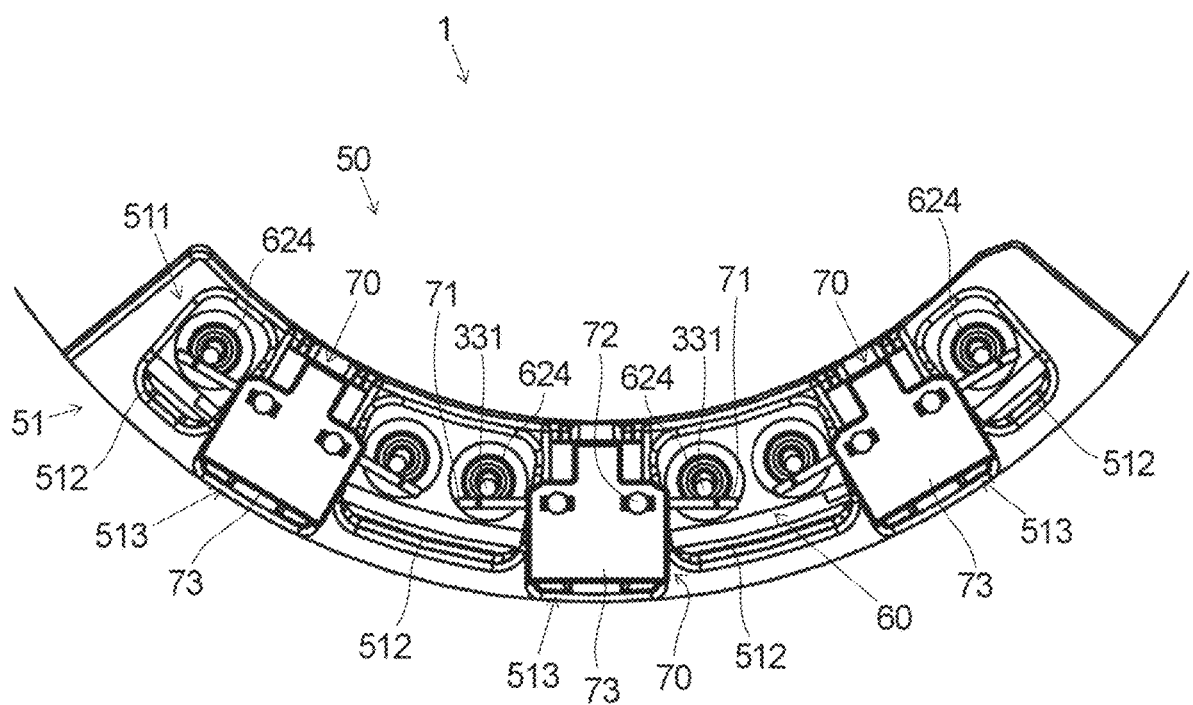
FIG. 3 is a partial plan view of the motor.

FIG. 1 is a longitudinal sectional view of a motor 1 of the example embodiment. FIG. 2 is a perspective view of the motor 1. FIG. 3 is a partial plan view of the motor 1. The motor 1 includes a rotor 20, a stator 30, bearings 40, a casing 50, a lead wire support portion 60, and terminals 70.

The rotor 20 is disposed on the radially inner side of the stator 30. The rotor 20 includes a shaft 21 disposed along a central axis C extending in the vertical direction. The shaft 21 is a columnar member that is made of, for example, metal and extends in the vertical direction.

The rotor 20 further includes a rotor core 22 and a magnet 23. The rotor core 22 has a cylindrical shape extending in the vertical direction, and is fixed to a radially outer circumferential portion of the shaft 21 inserted radially inward. The rotor core 22 is formed by, for example, layering a plurality of electromagnetic steel plates in the vertical direction.

The magnet 23 is fixed to a radially outer circumferential portion of the rotor core 22. The magnet 23 has, for example, a cylindrical shape extending in the vertical direction and is fixed to the radially outer circumferential portion of the rotor core 22. A radially outer circumferential surface of the magnet 23 faces a radially inner circumferential surface of the stator 30 in the radial direction. The magnet 23 has S poles and N poles alternately arranged in the circumferential direction.

The stator 30 is disposed on the radially outer side of the rotor 20. The stator 30 is disposed to face the rotor 20 in the radial direction. The stator 30 includes a stator core 31, an insulator 32, and a plurality of coils 33.

The stator core 31 includes a core back 311 and a plurality of teeth 312. The core back 311 is annular around the central axis C. A plurality of teeth 312 extend radially inward from a radially inner circumferential surface of the core back 311 toward the central axis C. The plurality of teeth 312 are arranged at predetermined intervals in the circumferential direction. The stator core 31 is formed by, for example, layering a plurality of electromagnetic steel plates in the vertical direction.

The insulator 32 is disposed on the stator core 31. The insulator 32 is provided to surround the outer surfaces of the teeth 312. The insulator 32 is disposed between the stator core 31 and the coil 33. The insulator 32 is made of, for example, an insulating member such as a synthetic resin. Note that radially inner circumferential surfaces of the teeth 312, which are portions facing the magnet 23, are exposed from the insulator 32.

The coil 33 is formed of a conductive wire wound around the insulator 32 in each of the plurality of teeth 312. That is, the insulator 32 is interposed between the teeth 312 and the coils 33. The teeth 312 and the coils 33 are electrically insulated from each other by the insulator 32. The plurality of coils 33 are arranged at predetermined intervals in the circumferential direction.

Note that the motor 1 has twelve coils 33 in the present example embodiment. Then, six sets of the coils 33 are formed by continuously winding two coils 33 as one set with one conductive wire. Each of the six sets of the six coils 33 has two lead wires 331 extending upward. That is, the motor 1 has twelve lead wires 331. Note that the lead wire 331 is a part of an end portion of the conductive wire forming the coil 33. However, a coil having a configuration different from the configuration of the present example embodiment can also be adopted.

A pair of the bearings 40 is disposed on the upper and lower sides in the axial direction. The bearing 40 on the upper side is disposed above the stator 30. The bearing on the lower side is disposed below the stator 30. The shaft 21 is fixed to the radially inner side of the pair of bearings 40. The pair of bearings 40 supports an upper portion and a lower portion of the shaft 21 so as to be rotatable about the central axis C.

The casing 50 encloses the rotor 20 and the stator 30. The casing 50 includes a bearing holding portion 51 and a motor housing (not illustrated). The bearing holding portion 51 has, for example, a cylindrical shape around the central axis C, and is disposed above the rotor 20 and the stator 30. The bearing holding portion 51 holds the bearing 40 on the upper side. Therefore, the casing 50 supports the rotor 20 with the bearing 40 interposed therebetween. The motor housing is disposed on a radially outer circumferential portion of the stator 30 and supports the stator 30 and the bearing 40 on the lower side. That is, the casing 50 supports the rotor 20 and the stator 30.

Note that the casing 50 may include a heat sink configured to dissipate heat generated when the motor 1 is used. Furthermore, the bearing holding portion 51 may also be configured to serve as the heat sink.

The lead wire support portion 60 is disposed above the stator 30. The lead wire support portion 60 has an annular shape extending along the circumferential direction of the stator 30 around the central axis C. The lead wire support portion 60 supports a plurality of (twelve) lead wires 331 extending from the plurality of coils 33.

The terminals 70 are attached to the casing 50. Specifically, the terminals 70 are disposed in an outer circumferential portion of the bearing holding portion 51 above the stator 30. The terminal 70 is electrically connected to the six lead wires 331 extending from the coils 33.

In the motor 1 configured as described above, when a drive current is supplied to the coils 33, a magnetic flux in the radial direction is generated in the stator core 31. A magnetic field generated by the magnetic flux of the stator 30 and a magnetic field generated by the magnet 23 act to generate torque in the circumferential direction of the rotor 20. The torque causes the rotor 20 to rotate about the central axis C.

Figure 4:
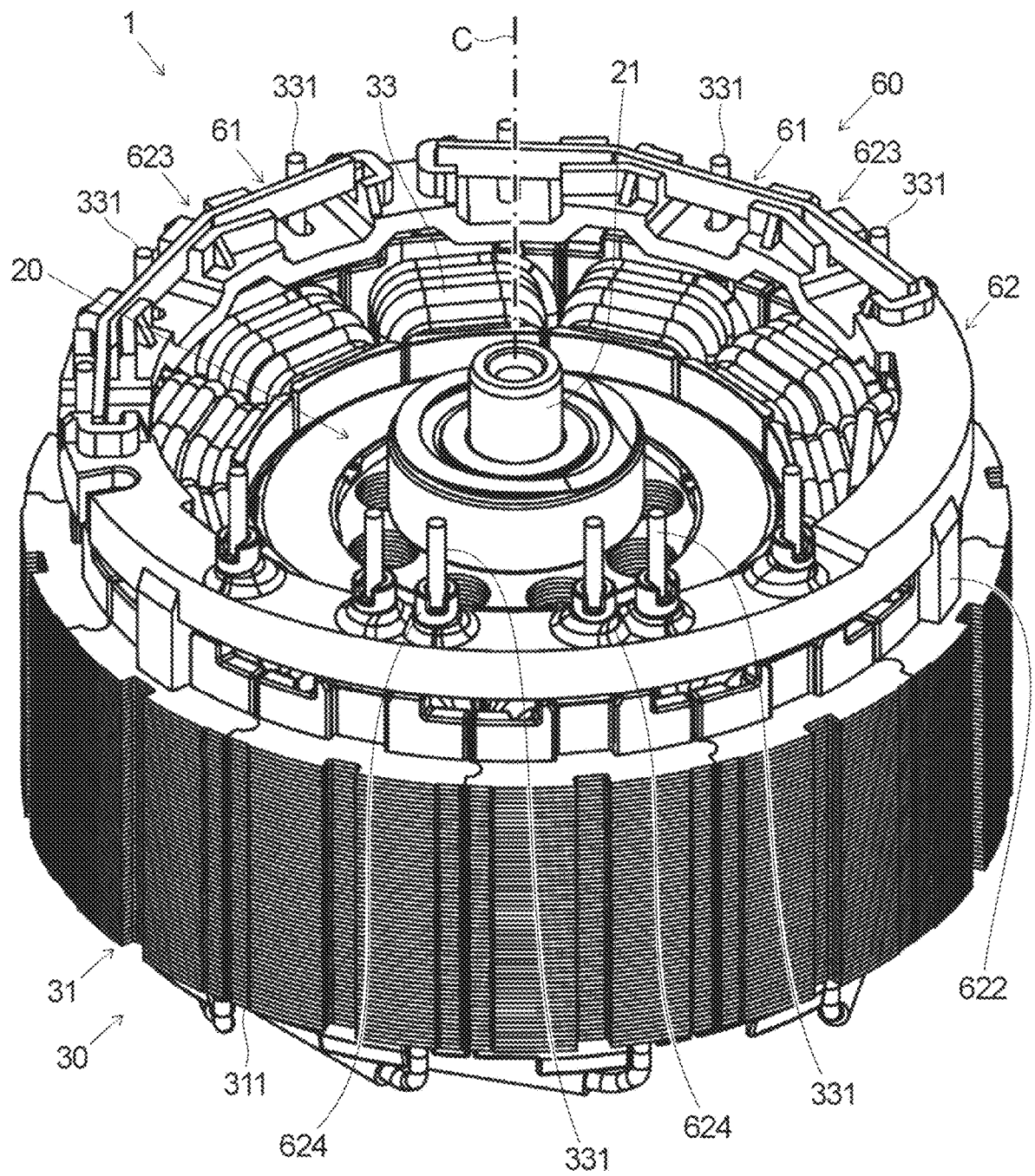
FIG. 4 is a perspective view of the motor from which a casing is removed.
Figure 5:
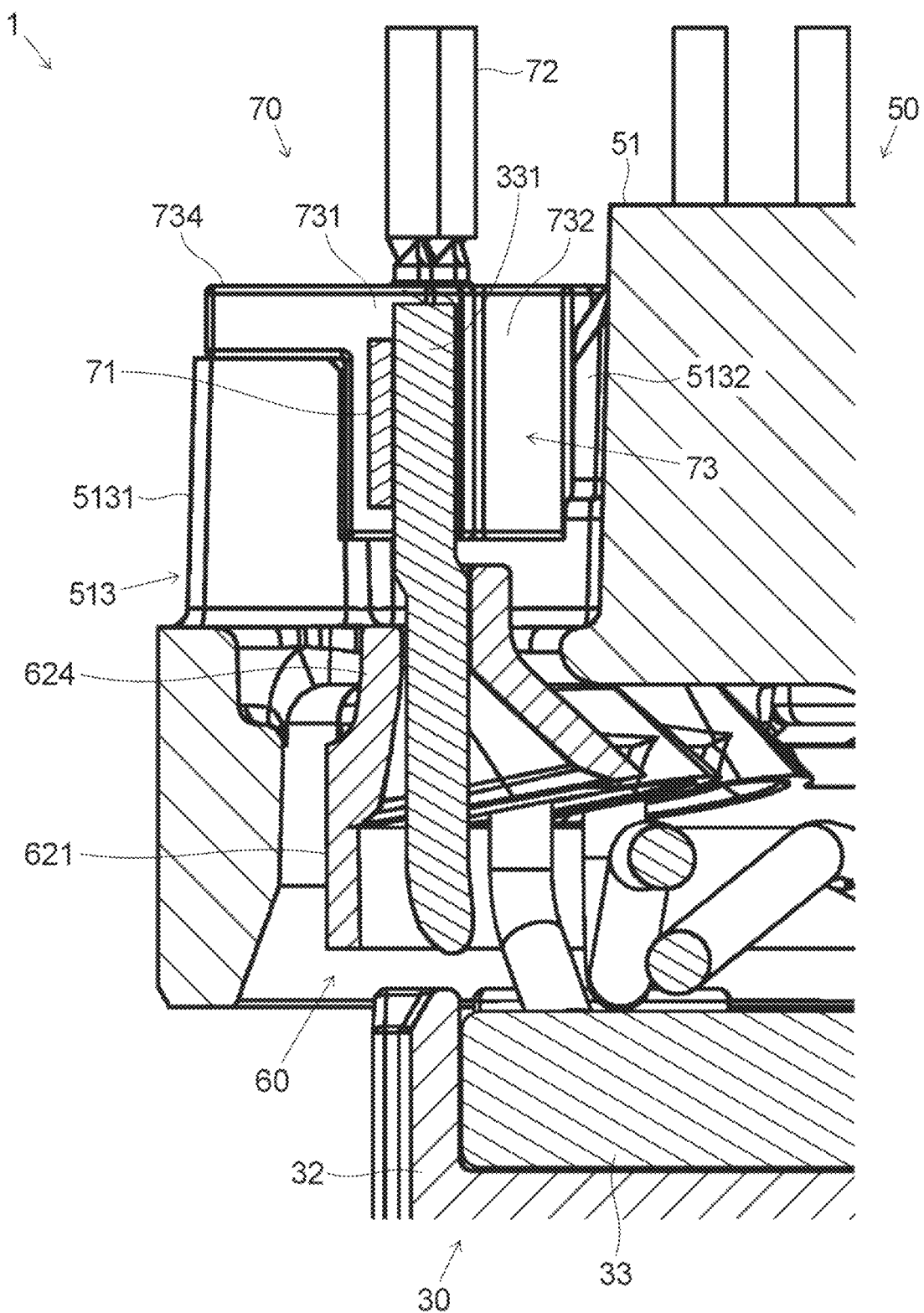
FIG. 5 is a partial longitudinal sectional view illustrating a site of a terminal of the motor.

FIG. 4 is a perspective view of the motor 1 from which the casing 50 is removed. FIG. 5 is a partial longitudinal sectional view illustrating a site of the terminal 70 of the motor 1. The lead wire support portion 60 includes conducting members 61 and an annular portion 62.

The conducting member 61 is a neutral point bus bar in the present example embodiment. Two conducting members 61 are attached to the annular portion 62. The conducting member 61 is a plate-like member extending along the circumferential direction of the stator 30, and is made of a material having high electrical conductivity such as copper. Each of the two conducting members 61 electrically connects a plurality of (three) lead wires 331. The three lead wires 331 are electrically connected in Y connection via the conducting members 61. Note that the lead wires 331 may be electrically connected to each other in a direct manner without using the conducting member 61. That is, the conducting member 61 may be the lead wire 331.

The annular portion 62 is disposed on the upper side of the radially outer circumferential side of the stator core 31 (see FIG. 4). The annular portion 62 extends annularly along the circumferential direction of the stator 30. The conducting member 61 is attached to the annular portion 62. The annular portion 62 includes an annular base 621, support columns 622, holding portions 623, and guide portions 624.

The annular base 621 is formed in a substantially plate shape extending annularly along the circumferential direction of the stator 30 around the central axis C and expanding in the radial direction. The support column 622 is disposed below the annular base 621. The holding portion 623 and the guide portion 624 are disposed above the annular base 621.

The support columns 622 are disposed on the lower surface of the annular base 621 and have a columnar shape extending downward. In the present example embodiment, three support columns 622 are provided and arranged at predetermined intervals in the circumferential direction. A lower end portion of the support column 622 is in contact with an upper surface of the core back 311. Therefore, the support column 622 supports the annular portion 62 on the upper side of the core back 311.

The holding portions 623 are disposed on the upper surface of the annular base 621. In the present example embodiment, the holding portions 623 are provided at two sites of the annular base 621 and disposed side by side in the circumferential direction. The holding portions 623 extend along the circumferential direction of the annular portion 62. The conducting members 61 are attached to the holding portions 623 along the circumferential direction of the annular portion 62. Therefore, the holding portions 623 hold the conducting members 61. The annular portion 62 can hold up to two conducting members 61. As illustrated in FIG. 4, each of the two conducting members 61 is in contact with the three lead wires 331.

The guide portion 624 is disposed on the upper surface of the annular base 621 and has a tubular shape extending upward. In the present example embodiment, six guide portions 624 are provided and disposed side by side in the circumferential direction. That is, the plurality of (six) guide portions 624 are connected by the annular base 621 having an annular shape. The six guide portions 624 are arranged adjacent to each other in the circumferential direction as a set of two. Three sets of the guide portions 624 are arranged at predetermined intervals in the circumferential direction.

The six lead wires 331 extending from the coils 33 are inserted into the guide portions 624 from below and guided toward the upper side of the guide portion 624. That is, the lead wire 331 passes through the guide portion 624, and the lead wire 331 is guided in the axial direction to the upper side of the lead wire support portion 60.

Figure 6:
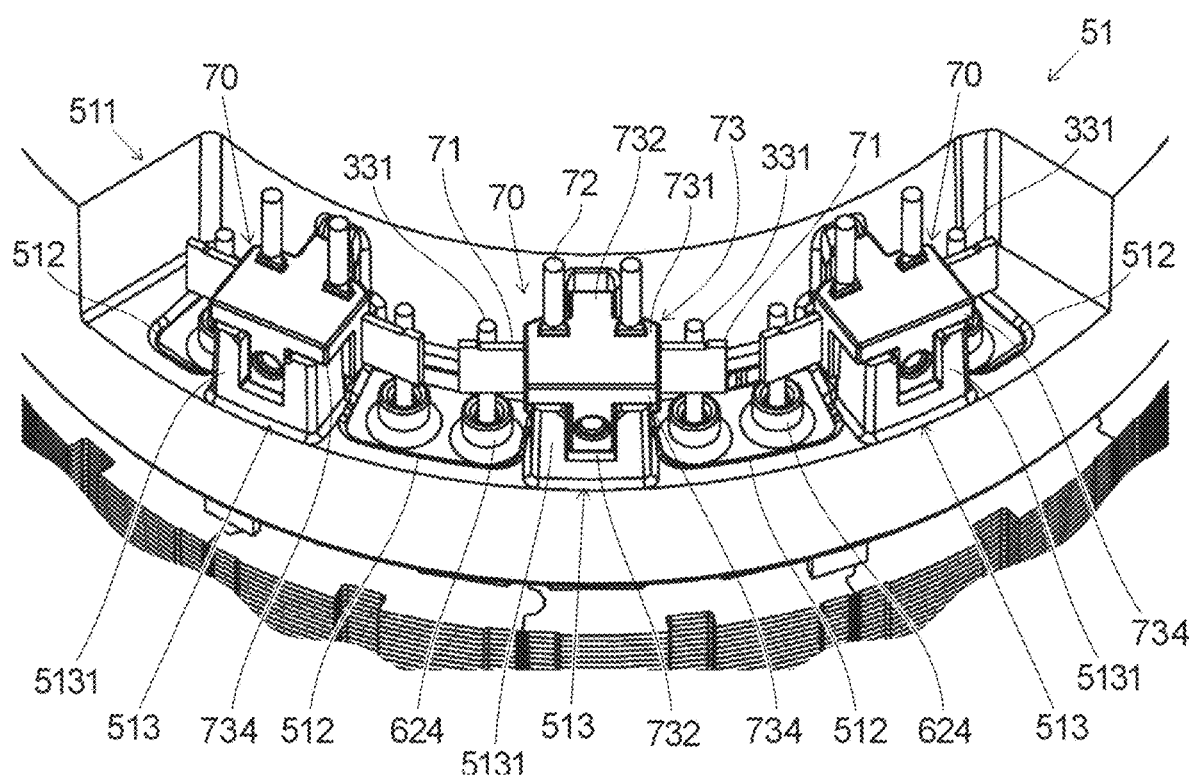
FIG. 6 is a partial perspective view of a bearing holding portion.
Figure 7:
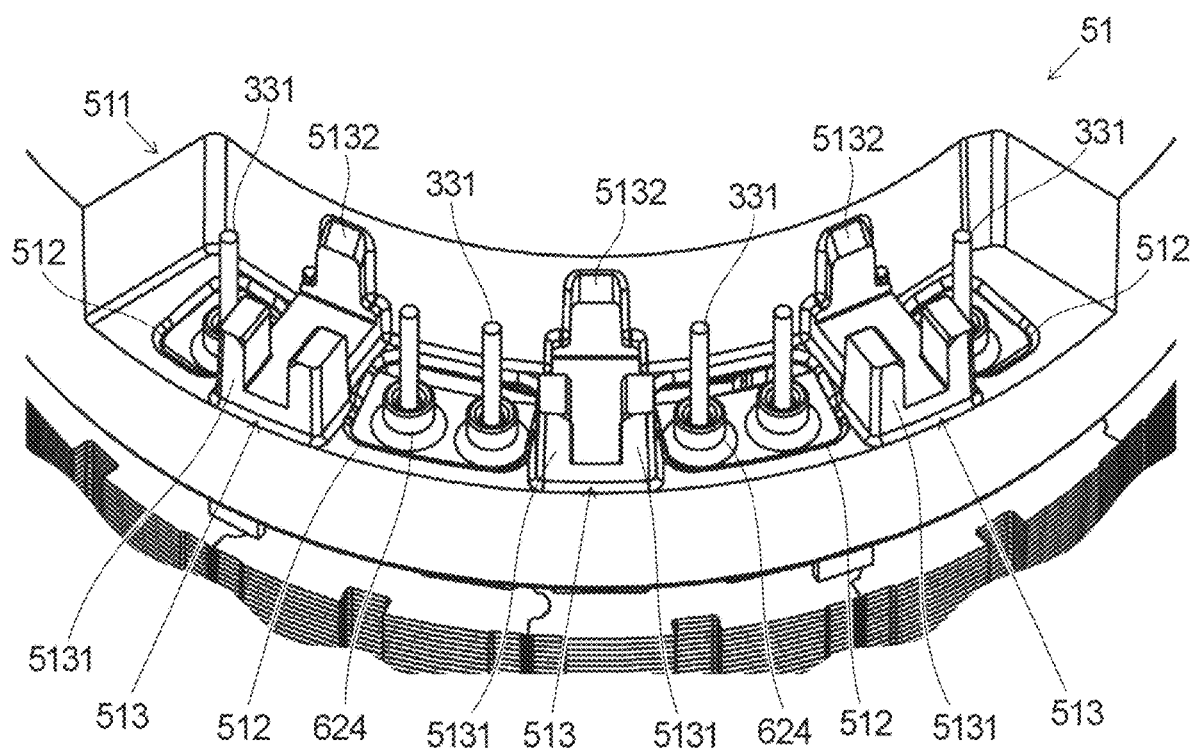
FIG. 7 is a partial perspective view of the bearing holding portion from which the terminal is removed.

FIG. 6 is a partial perspective view of the bearing holding portion 51. FIG. 7 is a partial perspective view of the bearing holding portion 51 from which the terminal 70 is removed. The bearing holding portion 51 includes a stepped portion 511, a plurality of openings 512, and a plurality of mounting portions 513.

The stepped portion 511 is disposed in a radially outer circumferential portion of an upper portion of the bearing holding portion 51. The stepped portion 511 is formed in an arc shape extending in the circumferential direction by a predetermined length. The stepped portion 511 is recessed downward from an upper surface of the bearing holding portion 51 by a predetermined height, and is recessed radially inward from a radially outer end portion of the bearing holding portion 51 by a predetermined length.

The plurality of openings 512 are disposed at an inner bottom of the stepped portion 511. In the present example embodiment, the bearing holding portion 51 has four openings 512. The four openings 512 are arranged in the circumferential direction. The opening 512 penetrates the bearing holding portion 51 in the vertical direction. The opening 512 has a substantially rectangular shape as viewed from above.

The guide portion 624 is inserted into the opening 512 from the lower side to the upper side. One guide portion 624 is inserted into each of the two openings 512 at both circumferential end portions among the four openings 512. Two guide portions 624 are inserted into each of two openings 512 closer to the circumferential central portion among the four openings 512. That is, the two openings 512 closer to the circumferential central portion among the four openings 512 are larger in size than the openings 512 at the both circumferential end portions.

The plurality of mounting portions 513 are disposed among the four openings 512 in the circumferential direction. That is, the bearing holding portion 51 has three mounting portions 513 in the present example embodiment. Each of the three mounting portions 513 is provided for three sets of the guide portions 624 arranged in the circumferential direction with two guide portions 624 as one set, and is disposed between the two guide portions 624 of each set as viewed from above. The terminal 70 is attached to the mounting portion 513.

As illustrated in FIGS. 6 and 7, the mounting portion 513 includes first support portions 5131 and a second support portion 5132.

The first support portion 5131 extends axially upward from an inner bottom surface of the stepped portion 511. In the present example embodiment, the mounting portion 513 has two first support portions 5131. The two first support portions 5131 are disposed to face each other in the direction intersecting the axial direction with second arms 732, which will be described later, of the terminal 70 attached to the mounting portion 513 interposed therebetween. The two first support portions 5131 have a rectangular parallelepiped shape.

The second support portion 5132 extends axially upward from the inner bottom surface of the stepped portion 511. In the present example embodiment, the mounting portion 513 has one second support portions 5132. The second support portion 5132 is disposed to face the first support portions 5131 in the radial direction with first arms 731 to be described later of the terminal 70 attached to the mounting portion 513 interposed therebetween. The second support portion 5132 has a rectangular parallelepiped shape.

According to the above configuration, when the terminal 70 is attached to the mounting portion 513, a holding portion 73 to be described later of the terminal 70 can be sandwiched among the two first support portions 5131 and the one second support portion 5132. Therefore, the terminal 70 can be fixed to the bearing holding portion 51.

Figure 8:
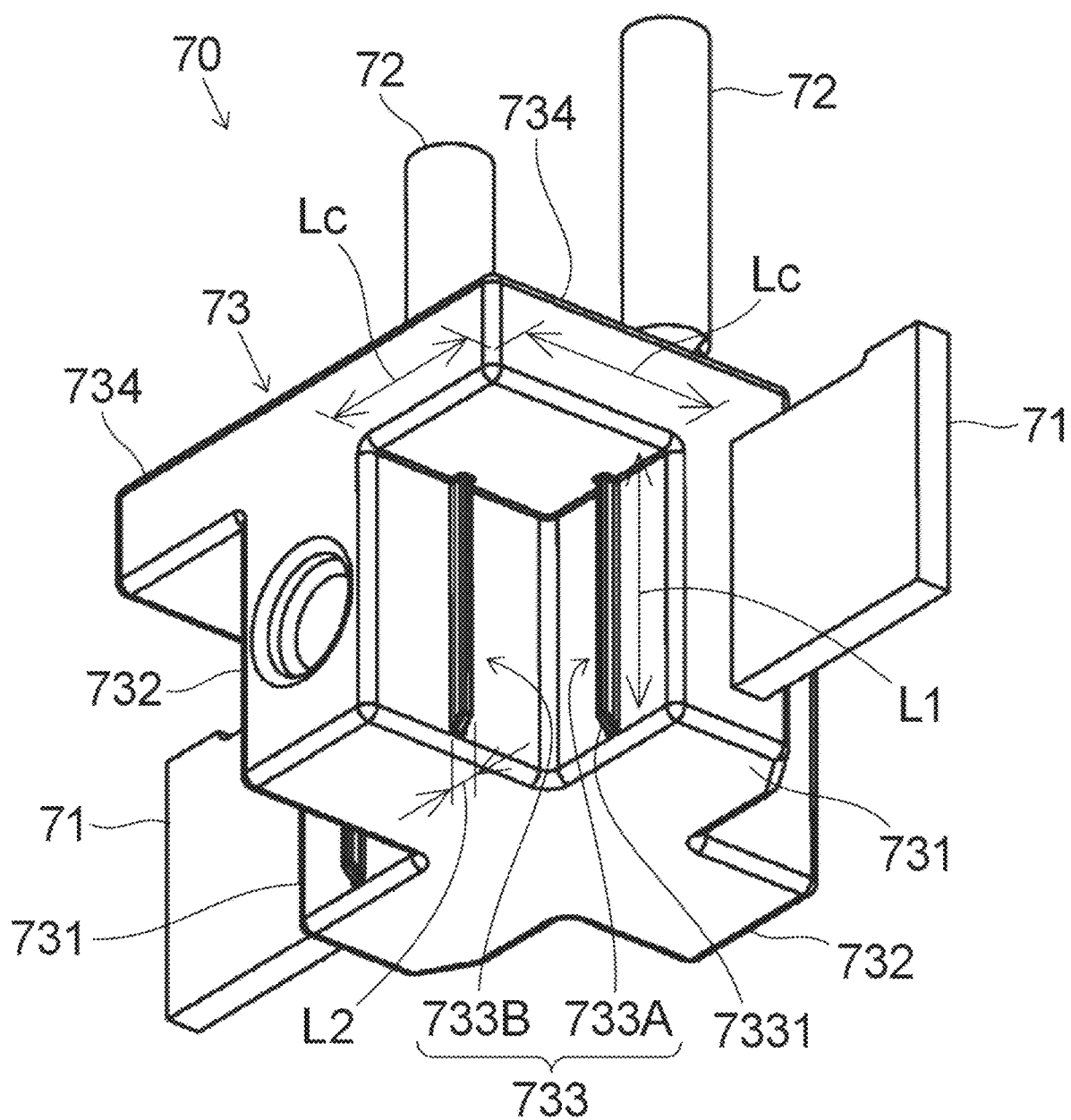
FIG. 8 is a perspective view of the terminal.

FIG. 8 is a perspective view of the terminal 70. The terminal 70 includes lead wire terminal portions 71, external terminal portions 72, and the holding portion 73.

The lead wire terminal portions 71 are disposed respectively on two side surfaces of the holding portion 73 facing directions intersecting the axial direction. The terminal 70 has the two lead wire terminal portions 71 extending in opposite directions. The lead wire terminal portion 71 protrudes from the holding portion 73 in the direction intersecting the axial direction and extends outward of the terminal 70.

The lead wire terminal portion 71 has a plate shape extending in its extending direction (protruding direction) and the axial direction, and is made of a material having high electrical conductivity such as copper. As illustrated in FIG. 6, each of the two lead wire terminal portions 71 is in contact with and electrically connected to the lead wire 331 drawn out from the guide portion 624 inserted into the opening 512. That is, the lead wire terminal portion 71 extends toward the lead wire 331.

Note that, for example, the lead wire terminal portion 71 may have a form in which a distal end portion is curved to wind and hold the lead wire 331. Further, for example, the lead wire terminal portion 71 may have a form in which a distal end portion is divided into a plurality of portions to sandwich the lead wire 331.

The external terminal portion 72 is disposed on an upper surface of the holding portion 73. The external terminal portion 72 extends axially upward toward the outside of the casing 50. In the present example embodiment, the terminal 70 has two external terminal portions 72. The number of the external terminal portions 72 may be changed on the basis of a value of a flowing current or the like. The external terminal portion 72 is electrically connected to the lead wire terminal portion 71 inside the terminal 70.

The external terminal portion 72 has a columnar shape extending in its extending direction thereof (the axial direction), and is made of a material having high electrical conductivity such as copper, for example. The external terminal portion 72 is electrically connected to a control board or the like outside the motor 1.

The holding portion 73 holds the lead wire terminal portion 71 and the external terminal portion 72. Each of the lead wire terminal portion 71 and the external terminal portion 72 extends outward from the holding portion 73. The holding portion 73 includes the first arms 731, second arms 732, ribs 733, and a cover portion 734.

The first arm 731 extends outward of the terminal 70 in the direction intersecting the axial direction. In the present example embodiment, the holding portion 73 has two first arms 731 extending in directions opposite to each other. The two first arms 731 have a rectangular parallelepiped shape. Each of the two first arms 731 extends along the extending direction (protruding direction) of each of the two lead wire terminal portions 71. The lead wire terminal portion 71 is exposed from a distal end portion of the first arm 731.

Note that at least one first arm 731 may be provided. For example, in a case where the lead wire 331 exists only on any one of both the circumferential sides of the terminal 70, the single first arm 731 may be provided.

The second arm 732 extends outward of the terminal 70 in the direction intersecting the extending direction of the first arm 731. In the present example embodiment, the second arm 732 extends in the radial direction. Further, the holding portion 73 has two second arms 732 extending in directions opposite to each other in the present example embodiment. The two second arms 732 have a rectangular parallelepiped shape. Note that at least one second arm 732 may be provided.

The ribs 733 are disposed on a side surface of the holding portion 73. Specifically, the ribs 733 include a rib 733A disposed on a side surface of the first arm 731 facing the radially outer side and a rib 733B disposed on a side surface of the second arm 732 facing the circumferential direction. The rib 733 is disposed axially below the cover portion 734. The rib 733 protrudes outward from the side surface of the holding portion 73.

The rib 733 extends in the axial direction (vertical direction). In other words, the rib 733 extends along a mounting direction of the casing 50 with respect to the mounting portion 513 (see FIGS. 6 and 7). In the mounting portion 513, the rib 733 is in contact with the casing 50. Specifically, the rib 733 is pressed against a wall surface of first support portion 5131 of the mounting portion 513.

Note that in the direction (a lateral direction) intersecting the axial direction, a space in the mounting portion 513 that the ribs 733 face is narrower than a thickness of the first arm 731 or the second arm 732 including the ribs 733. As a result, when the terminal 70 is attached to the mounting portion 513, the ribs 733 are pressed and deformed by contact with the mounting portion 513, and the terminal 70 is press-fitted into the mounting portion 513.

The cover portion 734 is disposed on the side surface of the holding portion 73 and protrudes outward. Specifically, the cover portion 734 is formed in a plate shape that connects the side surface of the first arm 731 and the side surface of the second arm 732. The cover portion 734 is disposed in an axially upper end portion of the holding portion 73 axially above the ribs 733. In other words, the cover portion 734 extends in a direction intersecting the extending direction of the rib 733 at one end portion in the extending direction (axial direction) of the rib 733.

Note that the cover portion 734 is located axially above the first support portion 5131 and faces the first support portion 5131 in the axial direction in a state where the terminal 70 is attached to the mounting portion 513. At this time, the first support portion 5131 is located between the inner bottom surface of the stepped portion 511 and the cover portion 734 in the axial direction.

According to the above configuration, even if the ribs 733 are deformed and chips are generated when the terminal 70 provided between the lead wire 331 of the coil 33 and the outside of the motor 1 is attached to the casing 50, scattering of the chips can be suppressed by the cover portion 734. Therefore, it is possible to suppress the scattering of the chips of members generated at the time of assembling the motor 1.

Further, the terminal 70 includes the plurality of ribs 733 protruding in different directions as described above. Specifically, the terminal 70 includes the rib 733A protruding from the side surface of the first arm 731 and the rib 733B protruding from the side surface of the second arm 732. As a result, the terminal 70 can be positioned in a plurality of directions.

More specifically, the plurality of ribs 733 include at least the rib 733A protruding in the radial direction and the rib 733B protruding in a direction (circumferential direction) orthogonal to the radial direction. As a result, the terminal 70 can be positioned in the radial direction and in the direction orthogonal to the radial direction.

Note that a protruding length Lc of the cover portion 734 with respect to the side surface of the holding portion 73 on which the rib 733 is provided is preferably 0.5 to 1.0 times a length L1 of the rib 733 in the extending direction. According to this configuration, the scattering of the chips of the ribs 733 can be suppressed, and the positioning accuracy of the terminal 70 can be enhanced.

In addition, a protruding length L2 of the rib 733 with respect to the side surface of the holding portion 73 on which the rib 733 is provided is preferably 0.05 to 0.1 times the protruding length Lc of the cover portion 734 with respect to the side surface of the holding portion 73 on which the rib 733 is provided. According to this configuration, the scattering of the chips of the ribs 733 can be suppressed, and the positioning accuracy of the terminal 70 can be enhanced.

Furthermore, the rib 733 has an inclined portion 7331. The inclined portion 7331 is disposed at an end portion of the rib 733 on a side closer to the casing 50 in the extending direction. In other words, the inclined portion 7331 is disposed at an axially lower end portion of the rib 733. A protruding length of the inclined portion 7331 with respect to the side surface of the holding portion 73 decreases toward a distal end in the axial direction. In other words, the inclined portion 7331 is formed such that the distal end has an acute angle as proceeding axially downward. As a result, the terminal 70 can be easily mounted to the mounting portion 513.

Further, the holding portion 73 includes the first arm 731 and the second arm 732 as described above. The terminal 70 has the first arm 731 and the second arm 732 extending in the directions intersecting each other, and thus, can be easily positioned with respect to the mounting portion 513.

Further, the external terminal portion 72 is configured by a press-fit terminal in the present example embodiment. According to this configuration, it is possible to easily make an electrical connection to a control board or the like outside the motor 1.

Further, three terminals 70 are disposed side by side in the circumferential direction in the present example embodiment. According to this configuration, it is possible to suppress the scattering of the chips of the ribs 733 in the motor 1 including the three terminals 70.

Next, modifications of the terminal 70 and the mounting portion 513 will be described. Note that the basic configuration of the modifications is the same as that of the above example embodiment described with reference to FIGS. 1 to 8, the same reference signs or the same names may be assigned to common components, and the description thereof may be omitted. Further, components excluding characteristic parts are not illustrated in the drawings.

Figure 9:
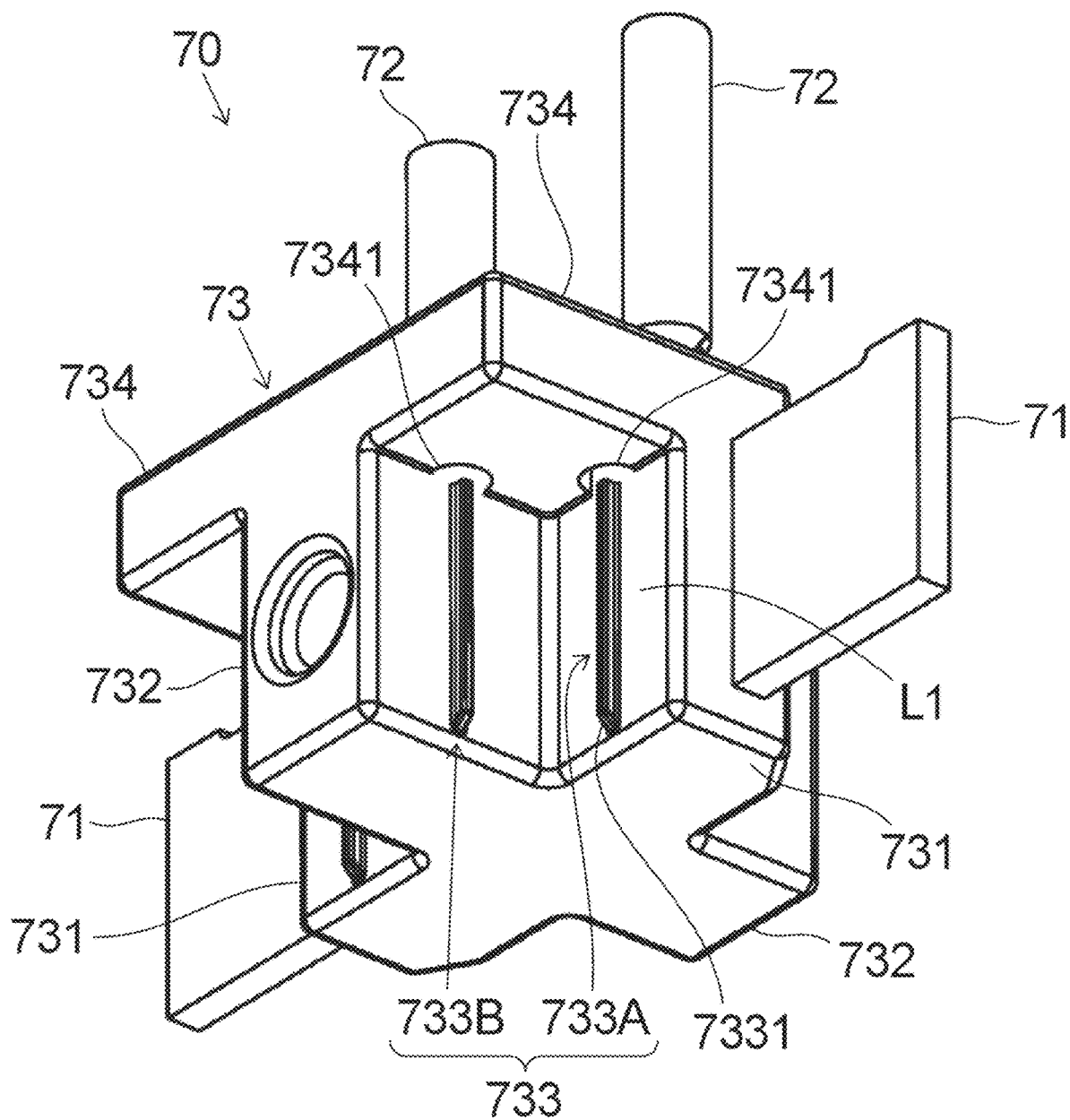
FIG. 9 is a perspective view of a terminal according to a first modification of an example embodiment of the present disclosure.

FIG. 9 is a perspective view of the terminal 70 according to a first modification. The cover portion 734 of the terminal 70 according to the first modification has a cover recess 7341. The cover recess 7341 is disposed in a region adjacent to an end portion of the rib 733. Specifically, the cover recess 7341 is disposed on a lower surface of the cover portion 734 at a position facing an axially upper end portion of the rib 733. The cover recess 7341 is recessed in the extending direction of the rib 733. Specifically, the cover recess 7341 is recessed axially upward.

According to the above configuration, even if chips of the rib 733 are generated when the terminal 70 is attached to the casing 50, the chips can be accommodated in the cover recess 7341. This makes it possible to effectively suppress scattering of the chips of the ribs 733.

Figure 10:
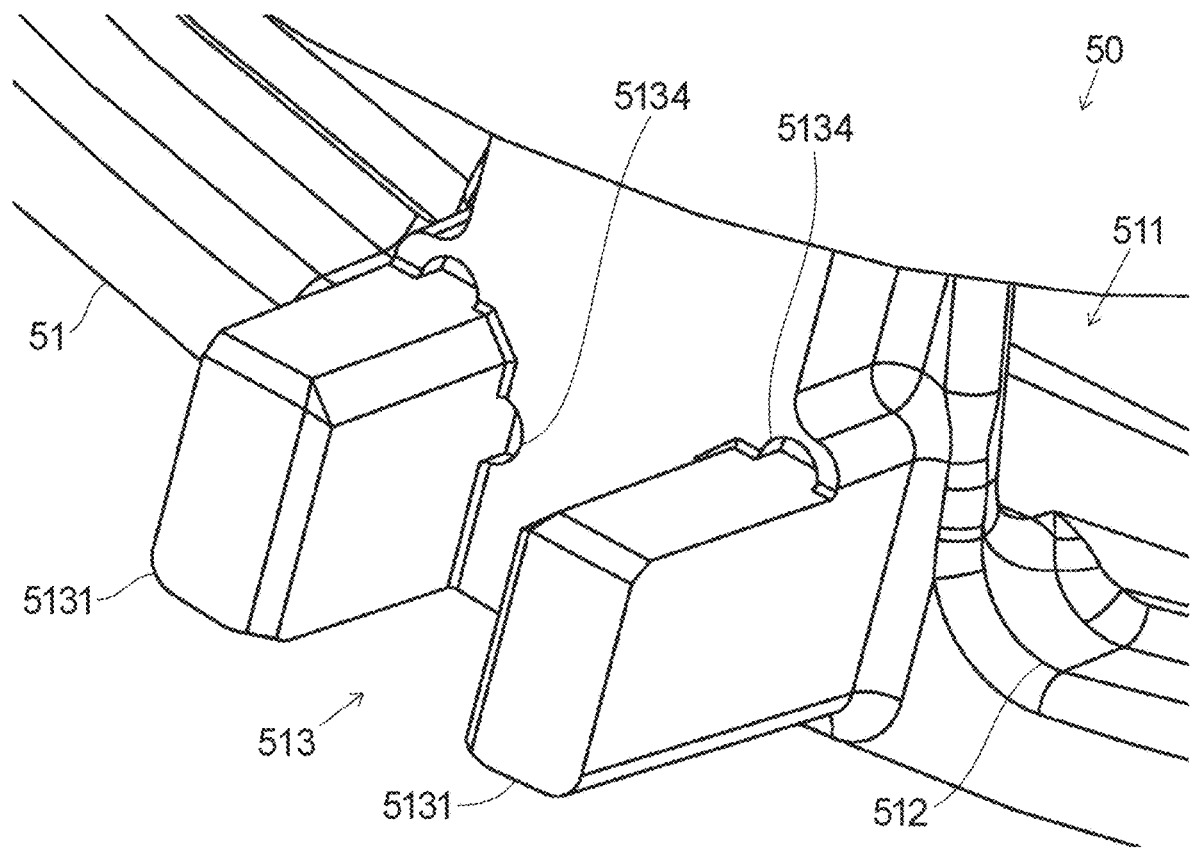
FIG. 10 is a perspective view of a mounting portion according to a second modification of an example embodiment of the present disclosure.

FIG. 10 is a perspective view of the mounting portion 513 according to a second modification. The casing 50 according to the second modification has a casing recess 5134. The casing recess 5134 is disposed in a region adjacent to an end portion of the rib 733. Specifically, the casing recess 5134 is disposed on a lower surface in the mounting portion 513 at a position facing an axially lower end portion of the rib 733. The casing recess 5134 is recessed in the extending direction of the rib 733. Specifically, the casing recess 5134 is recessed axially downward.

According to the above configuration, even if chips of the rib 733 are generated when the terminal 70 is attached to the casing 50, the chips can be accommodated in the casing recess 5134. This makes it possible to effectively suppress scattering of the chips of the ribs 733.

Although the example embodiment of the present disclosure has been described above, the scope of the present disclosure is not limited thereto. The present disclosure can be carried out with addition, omission, substitution, and various other modifications without departing from the gist of the present disclosure.

The present disclosure can be used in the motor.

Features of the above-described preferred example embodiments and the modifications thereof may be combined appropriately as long as no conflict arises.

While preferred example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
    a rotor that includes a shaft along a central axis extending in a vertical direction;
    a stator that includes coils and opposes the rotor in a radial direction;
    a casing that supports the rotor and the stator; and
    a terminal attached to the casing and electrically connected to lead wires extending from the coils; wherein
    the terminal includes:
        a lead wire terminal portion that is in contact with the lead wires;
        an external terminal portion that is electrically connected to the lead wire terminal portion and extends toward an outside of the casing; and
        a holding portion that holds the lead wire terminal portion and the external terminal portion; and
    the holding portion includes:
        a rib that protrudes outward from a side surface of the holding portion and is in contact with the casing; and
        a cover portion that extends in a direction intersecting an extending direction at one end portion of the rib in the extending direction.

2. The motor according to claim 1, wherein the cover portion includes a cover recess that is recessed in the extending direction in a region adjacent to an end portion of the rib.

3. The motor according to claim 1, wherein the casing includes a casing recess that is recessed in the extending direction in a region adjacent to an end portion of the rib.

4. The motor according to claim 1, wherein the terminal includes a plurality of the ribs protruding in different directions.

5. The motor according to claim 4, wherein the plurality of ribs include at least the rib protruding in the radial direction and the rib protruding in a direction orthogonal to the radial direction.

6. The motor according to claim 1, wherein the rib includes an inclined portion with a protruding length that decreases toward a distal end at an end portion of the rib on a side adjacent to the casing in the extending direction.

7. The motor according to claim 1, wherein a protruding length of the cover portion with respect to the side surface of the holding portion on which the rib is provided is about 0.5 to about 1.0 times a length of the rib in the extending direction.

8. The motor according to claim 1, wherein a protruding length of the rib is about 0.05 to about 0.1 times a protruding length of the cover portion with respect to the side surface of the holding portion on which the rib is provided.

9. The motor according to claim 1, wherein
    the holding portion includes:
        at least one first arm extending in a direction intersecting an axial direction and including a distal end portion from which the lead wire terminal portion is exposed; and
        at least one second arm extending in a direction intersecting an extending direction of the first arm and the axial direction.

10. The motor according to claim 1, wherein the external terminal portion is a press-fit terminal.

11. The motor according to claim 1, wherein three of the terminals are arranged side by side in a circumferential direction.

* * * * *